United States Patent [19]
Hirashima et al.

[11] Patent Number: 5,224,751
[45] Date of Patent: Jul. 6, 1993

[54] INSTRUMENT PANEL STRUCTURE OF VEHICLE

[75] Inventors: Isao Hirashima; Eiichi Hamanaga; Toshinori Sakamoto, all of Hiroshima, Japan

[73] Assignee: Mazda Motor Corporation, Hiroshima, Japan

[21] Appl. No.: 720,692

[22] Filed: Jun. 25, 1991

[30] Foreign Application Priority Data

Jun. 25, 1990 [JP] Japan .................. 2-66903[U]
Sep. 20, 1990 [JP] Japan .................. 2-252721

[51] Int. Cl.⁵ ............................................ B60K 37/02
[52] U.S. Cl. ........................................ 296/70; 180/90
[58] Field of Search ................... 296/70; 180/90; D12/192

[56] References Cited

U.S. PATENT DOCUMENTS 2,436,153 2/1948 Sanmori ................. 180/90 X
2,818,933 1/1958 Tell ........................ 296/70 X
2,841,233 7/1958 Nallinger .................. 180/90

FOREIGN PATENT DOCUMENTS 64-30734 2/1989 Japan .
1-190551 7/1989 Japan .
301312 2/1951 Switzerland .................. 180/90

Primary Examiner—Dennis H. Pedder

[57] ABSTRACT

An instrument panel structure or dashboard of a vehicle is constituted by an instrument panel arranged on the front side of a passenger room, a steering wheel, arranged in front of a driver's seat, for regulating a travel direction of the vehicle, and an operation switch mounting portion which is defined on the dashboard, and on which various operation switches are mounted. The operation switch mounting portion is curved so as to be located on the rear side of a vehicle body from a portion far from a mounting position of the steering wheel toward the mounting position of the steering wheel. The operation switch mounting portion has a first area which is defined on a portion near the mounting position of the steering wheel, and on which a first-class operation switch having the highest importance of the various operation switches is mounted.

10 Claims, 15 Drawing Sheets

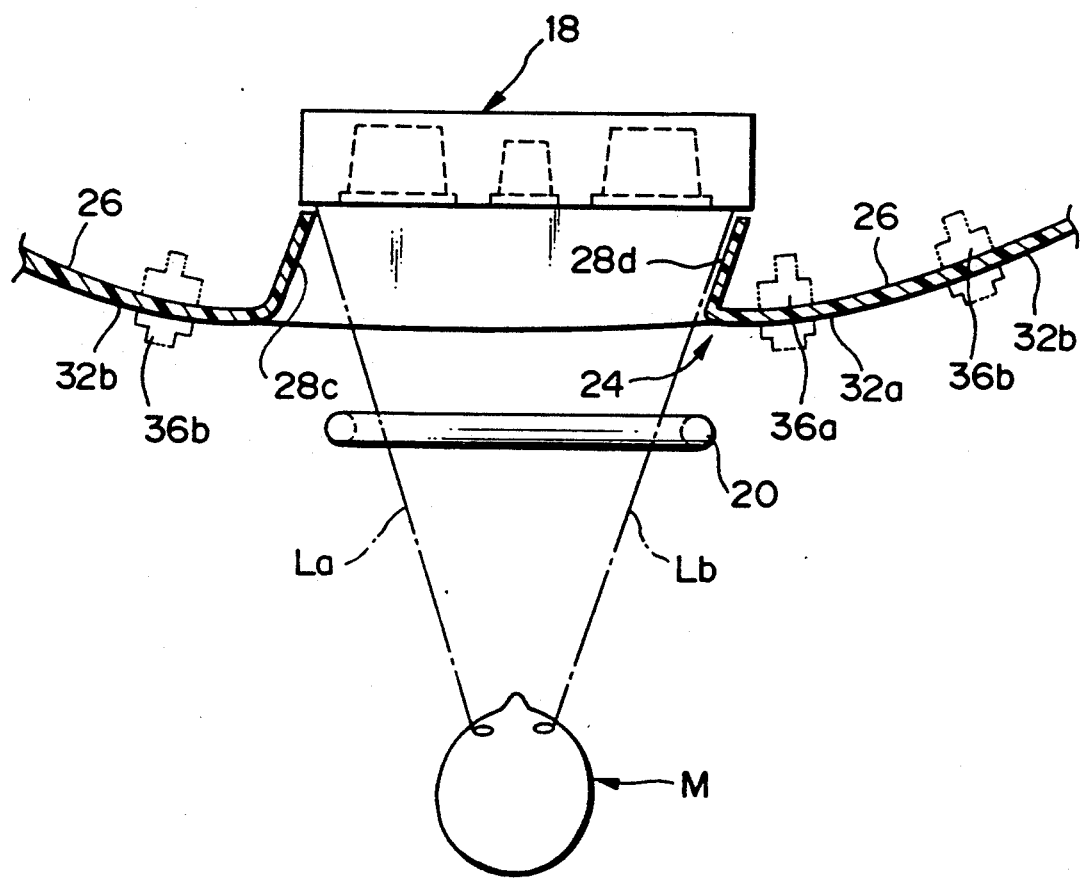
F I G. 15

INSTRUMENT PANEL STRUCTURE OF VEHICLE

BACKGROUND OF THE INVENTION

The present invention relates to an instrument panel or dashboard structure of a vehicle, which is arranged in a front portion of a passenger room.

As a conventional dashboard of a vehicle, a structure disclosed in, e.g., Japanese Patent Laid-Open No. 1-190551 is known. As shown in FIG. 1, various operation switches such as a car radio switch b, a fog lamp switch c, and the like are normally arranged on a conventional instrument panel a. The conventional instrument panel a is deformed so that the wall surface of the instrument panel a is curved toward a rear portion of a vehicle body as it is separated from a mounting position of a steering wheel d when the vehicle body is viewed from the top. When the instrument panel a is formed in this manner, the wall surface of the instrument panel a can be arcuated to have a driver position at the center.

When the instrument panel is arcuated to have the driver position at the center, a driver need only move a hand released from the steering wheel d along the arcuated wall surface of the instrument panel a, and can evenly easily operate the various operations switches b, c, and the like arranged on the wall surface of the instrument panel.

However, the times required for switch operations become substantially constant regardless of the importance of the operation switches b and c. For this reason, the operability is not satisfactory for operation switches which have a higher importance and which are required to be quickly operated as compared to other switches.

In order to shorten the operation times of the operation switches b and c, the instrument panel a may be arranged close to a driver. In this case, however, the driver feels oppression by the close instrument panel a, resulting in poor amenity.

A meter assembly e is a set of meters such as a speedometer, a fuel gauge, and the like, attached to a portion in front of a driver's seat, and a meter hood f is arranged around the meter assembly e, as described in, e.g., Japanese Utility Model Laid-Open No. 64-30734.

In general, the meter assembly e is attached to a recess portion in the instrument panel a for the purpose of, e.g., preventing degradation of visibility of the meters due to entrance/reflection of direct rays of the sun, as shown in FIGS. 2 and 3. The meter hood f is constituted by a flat portion g fixed along the surface of the instrument panel a, and upper, lower, right, and left longitudinal wall portions h extending from the flat portion g toward the front portion of the vehicle body, i.e., to the front end portion of the meter assembly e. The instrument panel attachments such as the above-mentioned operation switches b and c, indication lamps i and j, and the like are mounted on the flat portion g.

Conventionally, the meter hood f is obtained by integrally molding the flat portion g and the longitudinal wall portions h using, e.g., synthetic resin members. The longitudinal wall portions h are formed to be tapered wider toward a passenger M so as to allow easy mold releasing in a molding process.

When the meter hood f is formed into the tapered shape, the proximal end portions of the longitudinal wall portions h on the side of the passenger M extend outwardly from the meter assembly e. As a result, the mounting space of the attachments on the instrument panel a is limited, thus decreasing the degree of freedom in a layout.

In particular, a vehicle which has a lounge-like interior design, i.e., in which the instrument panel a and door trims are smoothly connected by a continuous curved surface, has been developed. In such a vehicle, since the right and left end portions of the instrument panel a are formed into a curved surface shape, an effective space for mounting the instrument panel attachments such as the operation switches, indication lamps, and the like, a ventilation outlet, and the like is further narrowed.

SUMMARY OF THE INVENTION

The present invention has been made to solve the above-mentioned problems, and has as its object to provide a dashboard structure of a vehicle, which allows quick operations of important operation switches.

It is another object of the present invention to provide a dashboard structure of a vehicle, which can prevent a driver from feeling oppression by an instrument panel.

It is still another object of the present invention to provide a dashboard structure of a vehicle, which improves a longitudinal wall shape of a meter hood so as to expand an effective mounting space of an instrument panel without impairing the visibility of the meters.

In order to achieve the above objects, according to one aspect of the present invention, there is provided a dashboard structure of a vehicle, which comprises an instrument panel arranged on a front side of a passenger room, a steering wheel, arranged in front of a driver's seat, for regulating a travel direction of the vehicle, and an operation switch mounting portion which is defined on the instrument panel, and on which various operation switches are mounted. The operation switch mounting portion is curved so as to be located on a rear side of a vehicle body from a portion far from a mounting position of the steering wheel toward the mounting position of the steering wheel. The operation switch mounting portion has a first area which is defined on a portion near the mounting position of the steering wheel, and on which a first-class operation switch having the highest importance of the various operation switches is mounted.

According to the arrangement of the present invention, important operation switches can be quickly operated. Since the operation switch mounting portion is curved to be displaced toward the front side of the vehicle body as it is separated from the mounting position of the steering wheel, a driver can be prevented from feeling oppression by the operation switch mounting portion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a schematic cross-sectional view showing another modification of the structure of the meter hood of the dashboard according to the embodiment of the present invention shown in FIG. 10.

DETAILED DESCRIPTION OF THE PREFERRED EMBODIMENTS

An instrument panel or dashboard structure of a vehicle according to an embodiment of the present invention will be described in detail below with reference to the accompanying drawings.

Figure 1:
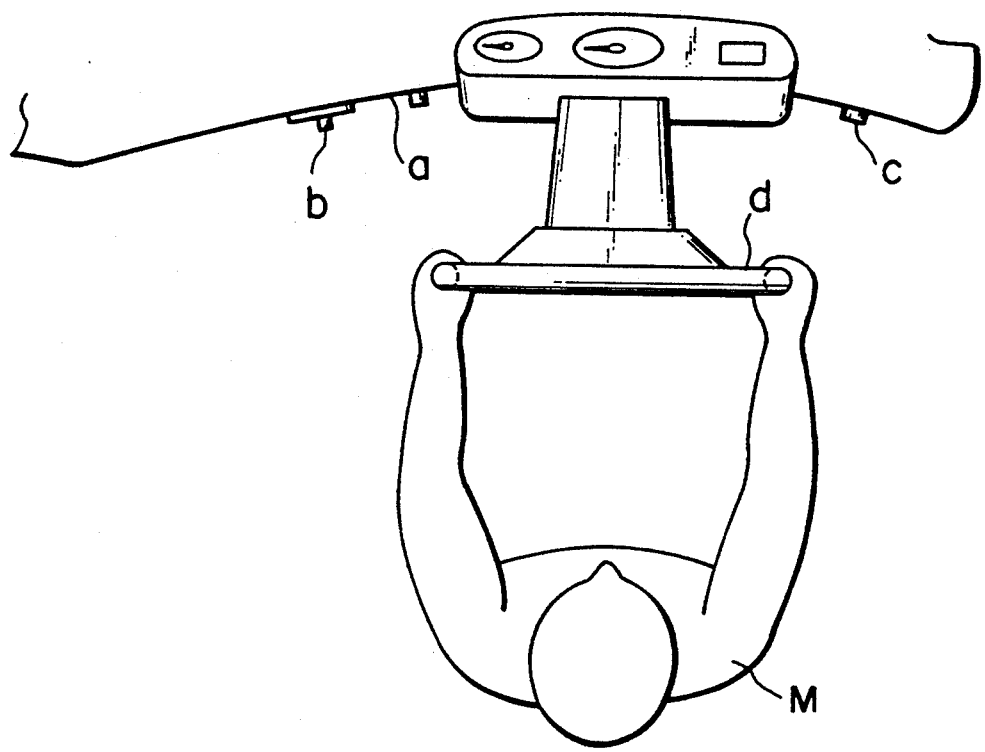
FIG. 1 is a schematic top view showing a conventional dashboard structure.
Figure 2:
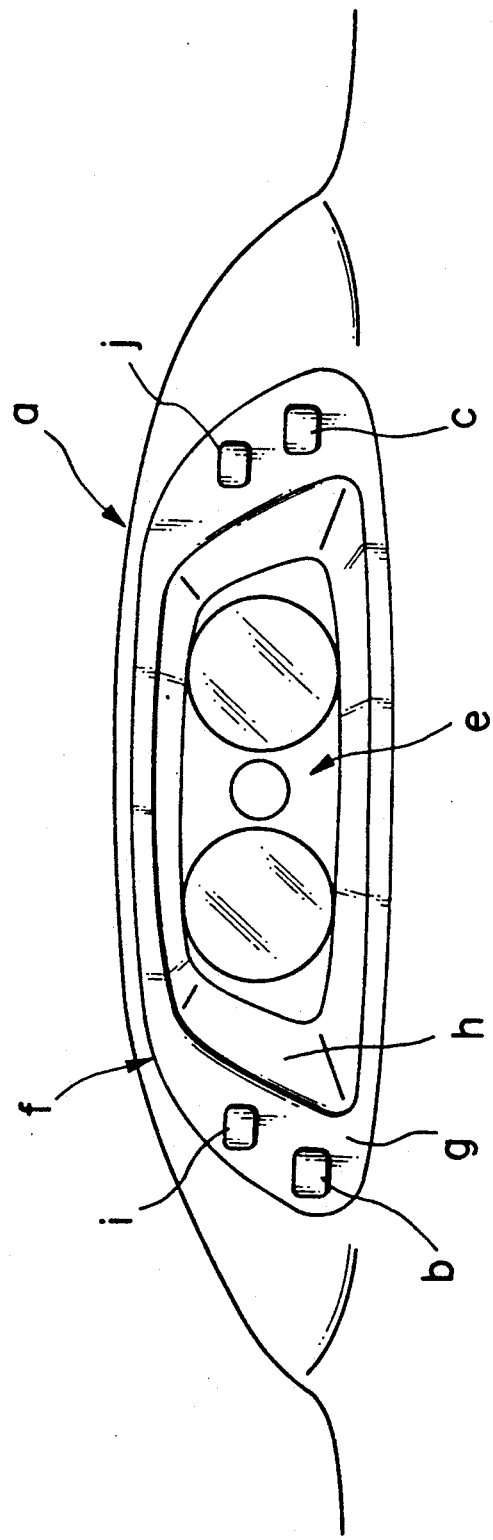
FIG. 2 is a front view showing a conventional structure of a meter hood attached to a dashboard.
Figure 3:
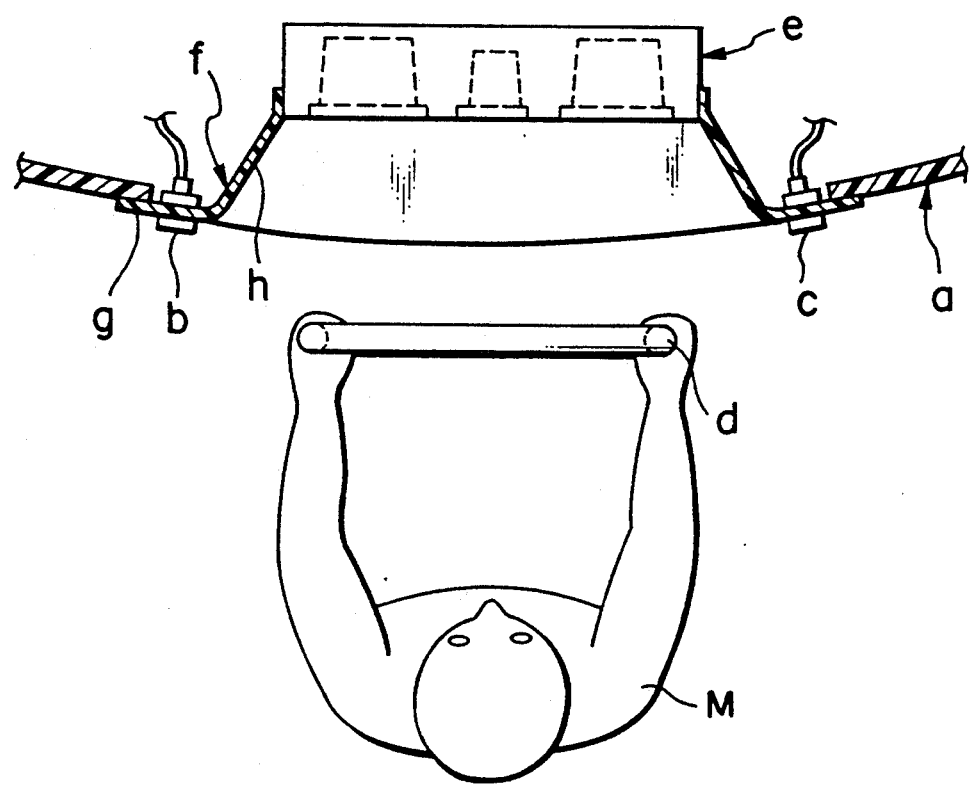
FIG. 3 is a cross-sectional view of the meter hood shown in FIG. 2.
Figure 4:
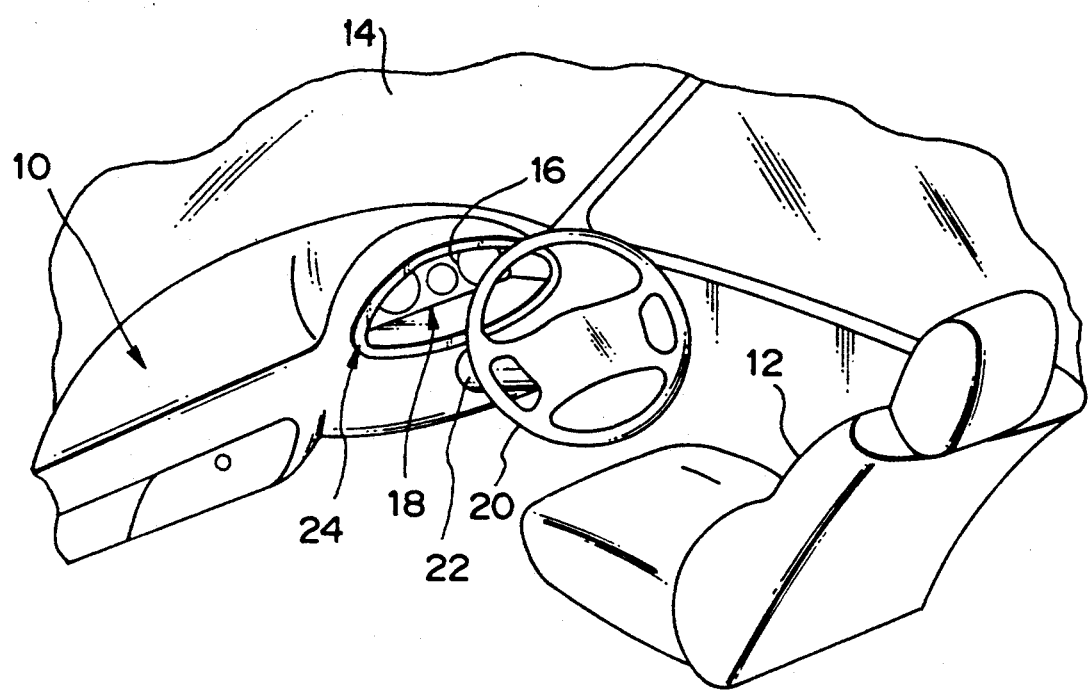
FIG. 4 is a perspective view showing the interior of a passenger room to which a dashboard structure of a vehicle according to the present invention is applied.

FIG. 4 shows a first embodiment of the instrument panel structure in a vehicle with a front window 14''. The instrument panel structure is mainly constituted by a dashboard 10 constituting a front portion of a passenger room, and a meter assembly or instrument panel 18 which is arranged on the dashboard 10 in front of a driver's seat 12, and comprises a set of meters such as a fuel gauge 16, and the like included in a meter assembly 18. A meter hood 24 is positioned around the meter assembly 18. A steering wheel 20 is arranged between the meter assembly 18 and the driver's seat 12, and is connected to dashboard 10 vis-a-vis a lower portion of the meter assembly 18 by a steering shaft or steering column 22 extending therefrom. The steering shaft or column 22 of the steering wheel 20 extends forward through the lower portion of the meter assembly 18, and projects into an engine room through a cowl panel (not shown).

Figure 5:
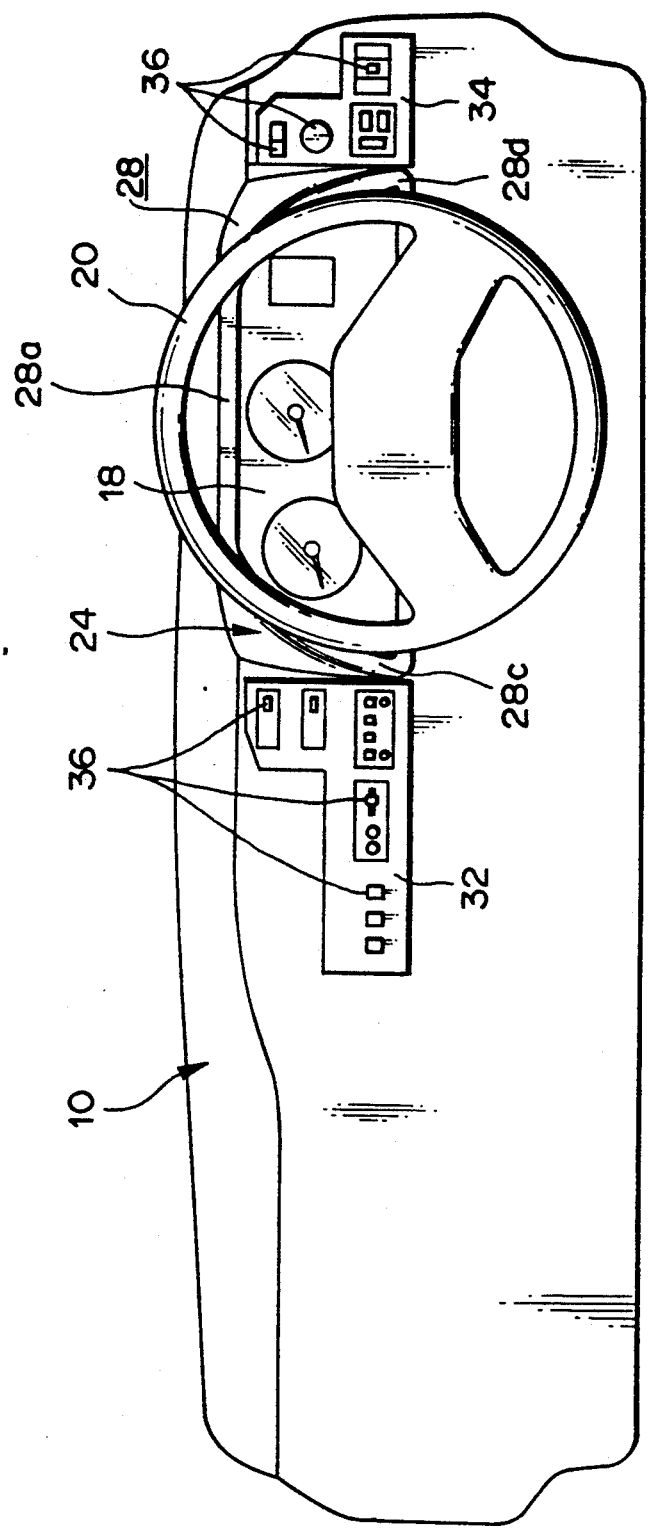
FIG. 5 is a front view showing a dashboard structure of a vehicle according to an embodiment of the present invention.
Figure 6:
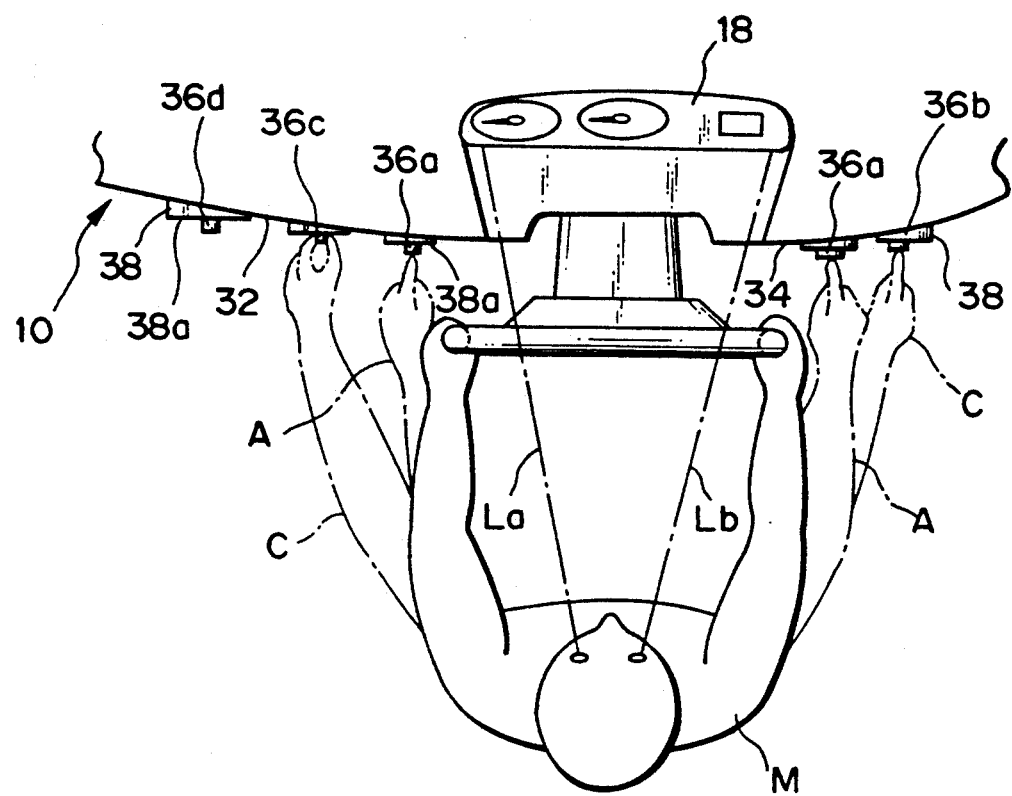
FIG. 6 is a top view showing a curved surface shape of an operation switch mounting portion of a dashboard shown in FIG. 5.

The meter assembly 18 is mounted on a recess portion in the dashboard 10 for the purpose of, e.g. preventing degradation of visibility of the meters due to entrance/reflection of direct rays of the sun. As shown in FIGS. 5 and 6, a synthetic resin meter hood 24 is arranged around the meter assembly 18 on the passenger or driver room side. The meter hood 24 is constituted by upper, lower, left, and right longitudinal wall portions 28a through 28d which are arranged to surround the meter assembly 18, and extend toward the front portion of the vehicle body to the circumferential edge portion of the meter assembly 18. As will be described in detail later, portions of the dashboard 10 located on the left and right sides of the meter hood 24 are defined as mounting portions 32 and 34 on which various operation switches 36 are mounted.

In this embodiment, the upper longitudinal wall portion 28a of the longitudinal wall portion 28 of the meter hood 24 is formed to be tapered wider from the meter assembly 18 toward a passenger M like in a conventional structure. However, at least one of the remaining three longitudinal wall portions 28b, 28c, and 28d, more specifically, the left and right longitudinal wall portions 28c and 28d are formed to be tapered wider toward the front portion of the vehicle body along outermost view lines La and Lb of a field of view of the passenger M who looks at the meter assembly 18. The proximal end portions of the tapered longitudinal wall portions 28c and 28d extend on two sides of the meter assembly 18.

The above-mentioned operation switch mounting portions 32 and 34 are curved, so that portions close to the mounting position of the steering wheel 20, i.e., portions adjacent to the meter hood 24 are located on the rearmost side of the vehicle body, and as the portions are separated from the mounting position of the steering wheel 20 in the widthwise direction of the vehicle body, they are located on the front side of the vehicle body when the vehicle body is viewed from the top, as shown in FIG. 6. More specifically, these operation switch mounting portions 32 and 34 are defined by an arcuated surface about the center defined on the front side of the dashboard 10.

Figure 7:
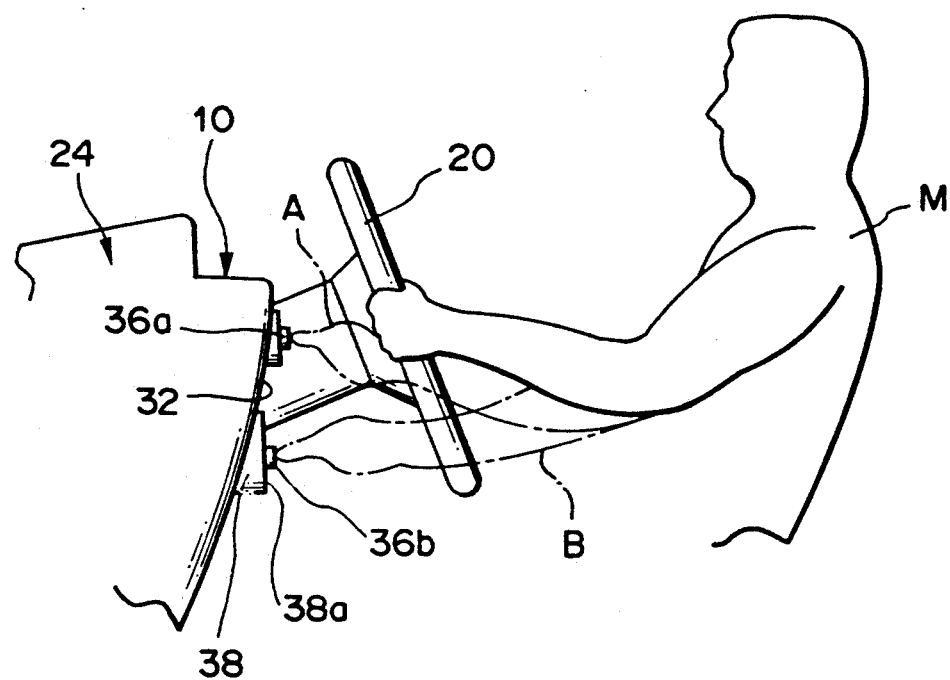
FIG. 7 is a side view showing the curved surface shape of the operation switch mounting portion of the dashboard shown in FIG. 5.

As shown in FIG. 7, these operation switch mounting portions 32 and 34 are curved, so that upper portions located near the steering wheel 20 are located on the rear side of the vehicle body, and lower portions are located on the front side of the vehicle body when the vehicle body is viewed from a side surface.

Figure 8:
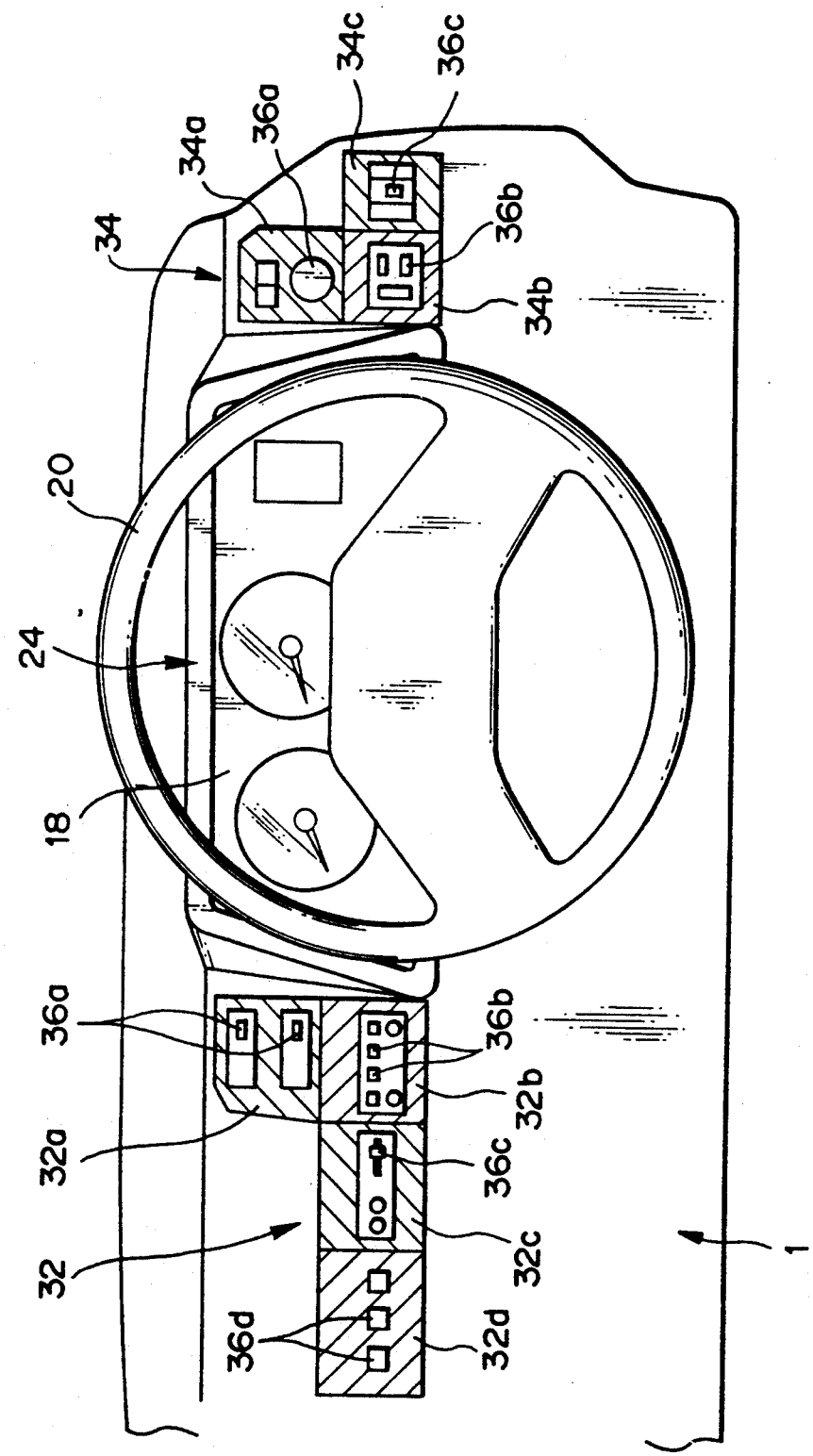
FIG. 8 is a front view showing an area division state of the operation switch mounting portion.

In this embodiment, on the operation switch mounting portions 32 and 34, mounting areas of operation switches are defined in accordance with distances from the mounting position of the steering wheel 20, as indicated by hatching in FIG. 8. More specifically, portions closest to the mounting position of the steering wheel 20 are defined as a pair of left and right first areas 32a and 34a, and portions located below these areas are defined as a pair of left and right second areas 32b and 34b. Portions located outside the second areas 32b and 34b are defined as a pair of left and right third areas 32c and 34c. A portion located outside the left third area 32c is defined as a fourth area 32d.

Operation switches are mounted on the first areas 32a and 34a to the fourth area 32d in accordance with their importances. More specifically, operation switches 36a having the highest importance, more particularly, the important switches which are most closely related to the safety of the vehicle, and operate equipments which are relatively frequently used, e.g., first-class operation switches 36a such as front and rear window defroster switches, a rear wiper switch, a hazard way light switch, and the like, are arranged on the first areas 32a and 34a.

On the second areas 32b and 34b, operation switches having the next highest importance to the first-class operation switches 36a, more particularly, operation switches 36b which are relatively closely related to the safety of the vehicle, and are relatively frequently used, e.g., second-class operation switches 36b such as a fan switch, a radio tuning switch, a panel light register switch, and the like, are arranged thereon. On the third areas 32c and 34c, operation switches having a next higher importance to the second-class operation switches 36b, e.g., third-class operation switches 36c such as a fresh air amount control switch, a mode control switch, a swing louver switch, and the like are arranged thereon. On the fourth area 32d, fourth-class operation switches 36d such as power window switches which are not directly related to the safety of the vehicle, remote control mirror switches which may not be operated during travel, and the like, are arranged thereon.

Bulged portions 38 each having a switch arranging surface 38a inclined to face a driver are integrally formed on the operation switch mounting portions 32 and 34, as shown in FIGS. 6 and 7. When the corresponding switches 36a through 36d are mounted on these switch arranging surfaces 38a, they can be directed to the driver.

In this structure, when a driver operates the first-class operation switches 36a arranged on the first areas 32a and 34a while driving the vehicle, he or she stretches forward his left or right hand released from the steering wheel 20 to touch the desired first-class operation switch 36a with his finger, as indicated by an imaginary line A in FIGS. 6 and 7, so that he or she can quickly and reliably operate the desired switch. When the driver operates the second-class operation switches 36b arranged on the second areas 32b and 34b from the operating state of the first-class operation switches 36a, he simply moves his left or right hand downward and forward, as indicated by an imaginary line B in FIG. 7. With this operation, the driver can access the second-class operation switches 36b, and can operate these switches.

When the driver operates the third-class operation switches 36c arranged on the third areas 32c and 34c from the operating state of the second-class operation switches 36b, he moves his left hand toward the outer left side and forward, or moves his right hand toward the outer right side and forward, as indicated by an imaginary line C in FIG. 6. With this operation, the driver can access the third-class operation switches 36c, and can operate these switches. When the driver operates the fourth-class operation switches 36d arranged on the fourth area 32d, he moves his left hand toward the further outer left side and forward. With this operation, the driver can access the fourth-class operation switches 36d, and can operate these switches.

In this manner, the dashboard 10 is curved so that the first areas 32a and 34a, closest to the mounting position of the steering wheel 20, of the areas 32a through 32d and 34a through 34c of the operation switch mounting portions 32 and 34 arranged on the dashboard 10, are located on the rearmost side of the vehicle body. As a result, the first areas 32a and 34a are arranged at positions closest to a driver. The first-class operation switches 36a having the highest importance of the various operations switches 36a through 36d are arranged on the first areas 32a and 34a. As a result, a driver need only slightly extend his hand released from the steering wheel 20 forward so as to quickly operate the first-class operation switches 36a.

In this embodiment, the wall surface of the dashboard 10 is located on the front side of the vehicle body as it is separated from the mounting position of the steering wheel 20. For this reason, the third areas 32c and 34c, and the fourth area 32d separated from the steering wheel 20 are largely distant from the driver, and a feeling of oppression against the driver can be eliminated.

In this embodiment, the switch arranging surfaces 38a facing the driver are formed on the operation switch mounting portions 32 and 34 of the dashboard 10, as described above. Therefore, the operation switches 36a through 36d arranged on these switch arranging surfaces 38a are directed toward the driver, and the operability of the operation switches 36a through 36d can be guaranteed. More specifically, since the operation switch mounting portions 32 and 34 of the dashboard 10 are curved so that their side portions are located on the front side of the vehicle body, their wall surfaces are inclined to be directed outside the vehicle body. When the operation switches 36a through 36d are arranged on these inclined surfaces, they are also directed outside the vehicle. In contrast to this, as described above, since the operation switches 36a through 36d are arranged on the switch arranging surfaces 38a formed to face the driver so as to be directed toward the driver, the visibility and operability of these operation switches 36a through 36d can be improved.

More preferably, the dashboard panel 10 and the longitudinal wall portions 28a through 28d of the above-mentioned meter hood 24 are independently formed so as to allow easy mold releasing in a molding process without using special molds. The left and right longitudinal wall portions 28c and 28d of the meter hood 24 ar inclined to be tapered wider toward the front side of the vehicle body along the outermost view lines La and Lb of the field of view of the passenger M who is seated on the driver's seat 12 and looks at the meter assembly 18. Therefore, the field of view of the passenger M will not be narrowed, and the visibility of the meters 16 from the passenger M can be prevented from being impaired.

In this manner, according to this embodiment, since the left and right longitudinal wall portions 28c and 28d of the longitudinal wall portions 28a through 28d of the meter hood 24 are formed so that their proximal end portions on the front side of the vehicle body extend on the two sides of the meter assembly 18 along the outermost view lines La and Lb of the field of view of the passenger M who looks at the meter assembly 18, the field of view of the passenger M who looks at the meters 16 can be assured.

The present invention is not limited to the structure of the above embodiment, and various changes and modifications may be made within the spirit and scope of the invention.

For example, in the above embodiment, the dashboard 10 is curved in the widthwise direction of the vehicle body, so that the portions adjacent to the mounting positions of the steering wheel 20 of the operation switch mounting portions 32 and 34 are located on the rear side of the vehicle body when viewed from the top of the vehicle body. In addition, the dashboard is curved in the vertical direction, so that its upper portion adjacent to the mounting position of the steering wheel is located on the rear side of the vehicle body when viewed from the side surface of the vehicle body. However, the present invention is not limited to this structure. More specifically, the dashboard 10 need not always be curved in the two directions, but may be curved in either direction.

In the above embodiment, the left operation switch mounting portion 32 of the dashboard is divided into the first to fourth areas 32a through 32d, and the right operation switch mounting portion 34 is divided into the first to fourth areas 34a through 34c. However, the present invention is not limited to this arrangement. More specifically, the operation switch mounting areas 32 and 34 need not always be divided into clear areas.

The types of operation switches 36a through 36d arranged on the operation switch mounting portions 32 and 34 are not limited to those used in the above embodiment, and may be variously modified.

Figure 9:
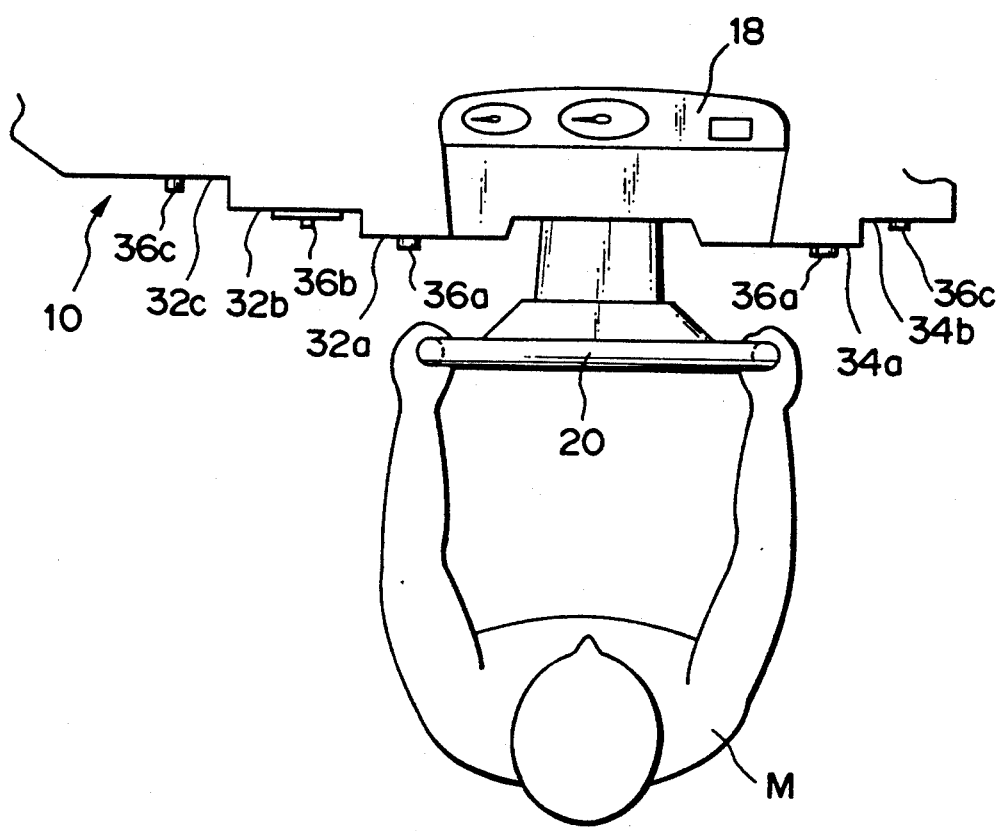
FIG. 9 is a schematic top view showing a modification of the dashboard structure according to the embodiment of the present invention.
Figure 10:
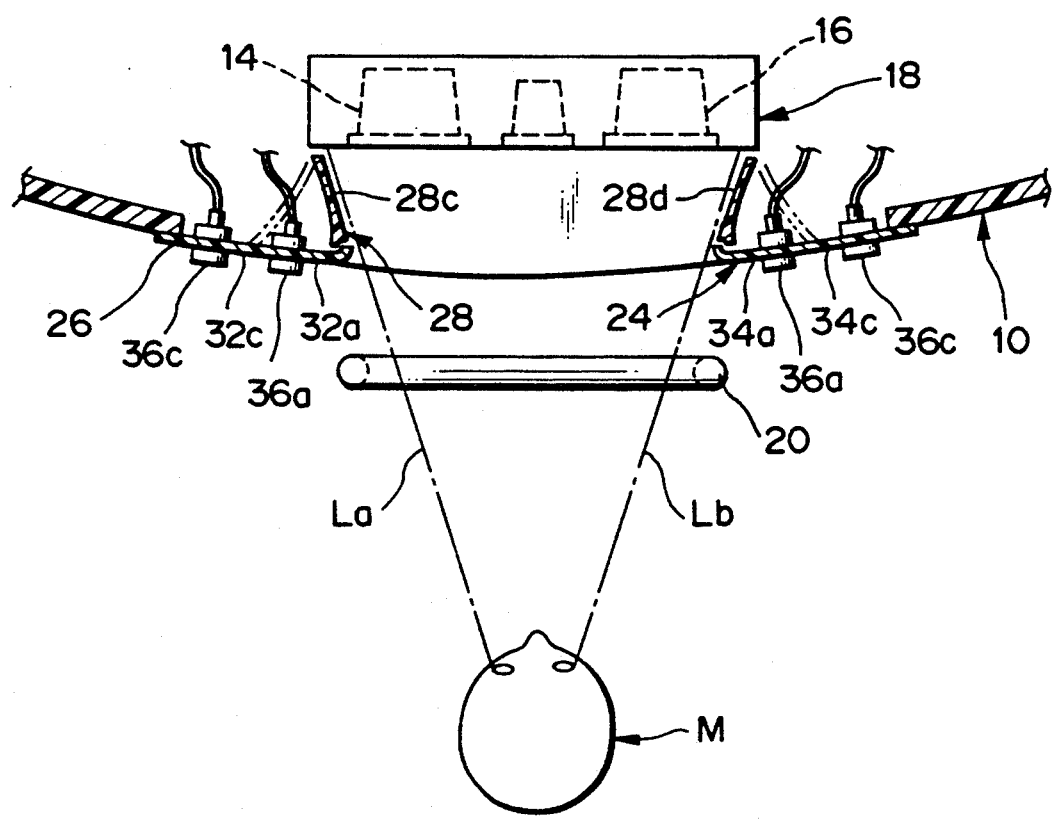
FIG. 10 is a cross-sectional view showing a structure of a meter hood in dashboard structure according to another embodiment of the present invention.

In the above embodiment, the operation switch mounting portions 32 and 34 of the dashboard 10 are smoothly curved. However, the present invention is not limited to this structure. For example, as shown in FIG. 9 as a modification, the operation switch mounting portions 32 and 34 may be bent stepwise, so that portions adjacent to the mounting position of the steering wheel 20 are located on the rear side of the vehicle body as compared to the remaining portions.

In the above embodiment, the operation switch mounting portions 32 and 34 are constituted by portions of the dashboard 10 located on the two sides of the meter hood 24. However, the present invention is not limited to this structure. For example, as shown in FIGS. 10 through 14 as another embodiment, the operation switch mounting portions 32 and 34 may be arranged on the meter hood 24. A structure according to this other embodiment of the present invention will be described below. The same reference numerals in the following description denote the same parts as in the above embodiment, and a detailed description thereof will be omitted.

As has already been described in the above embodiment, in the meter hood 24, the left and right longitudinal wall portions 28c and 28d are formed into a tapered shape, and as a result, the rear end portions of the left and right longitudinal wall portions 28c and 28d, i.e., the end portions near a driver extend inwardly as compared to the left and right ends of the meter assembly 18. Therefore, a curved surface portion 26 can be integrally attached to the rear end portions of the left and right longitudinal wall portions 28c and 28d. The operation switch mounting portions 32 and 34 are defined on the curved surface portion 26. More specifically, in this embodiment, since the left and right longitudinal wall portions 28c and 28d of the meter hood 24 are formed into a tapered shape, so that they extend along view lines of a driver, an extra space as compared to a conventional structure can be utilized to define the operation switch mounting portions 32 and 34.

More specifically, in this embodiment, the meter hood 24 is constituted by the curved surface portion 26 fixed along the surface of the dashboard 10, and the upper, lower, left, and right longitudinal wall portions 28 (28a through 28d) extending from the curved surface portion 26 toward the front side of the vehicle body to the front end portion of the meter assembly 18. The left and right outer portions of the curved surface portion 26 are defined as the operation switch mounting portions 32 and 34. In this embodiment, the curved surface portion 26 on which the operation switch mounting portions 32 and 34 are defined is curved, so that portions adjacent to the mounting position of the steering wheel 20 are located on the rearmost position in the back-and-forth direction of the vehicle body, and outer portions are gradually displaced forward like in the above embodiment.

With this structure, the curved surface portion 26 defined as the rear end portion of the meter hood 24 is extended in the right-and-left direction. As a result, the effective mounting space of the operation switches 26a through 26d on the rear end portion of the meter hood 24 can be extended as compared to a conventional structure (indicated by an alternate long and two short dashed line in FIG. 10) in which left and right longitudinal wall portions are tapered wider toward a passenger M. Other instrument panel attachments, e.g., lamps, are mounted on the extended space (in other words, the curved surface portion 26 as an extended portion) in addition to the operation switches 36a through 36d conventionally mounted on this portion.

Figure 11:
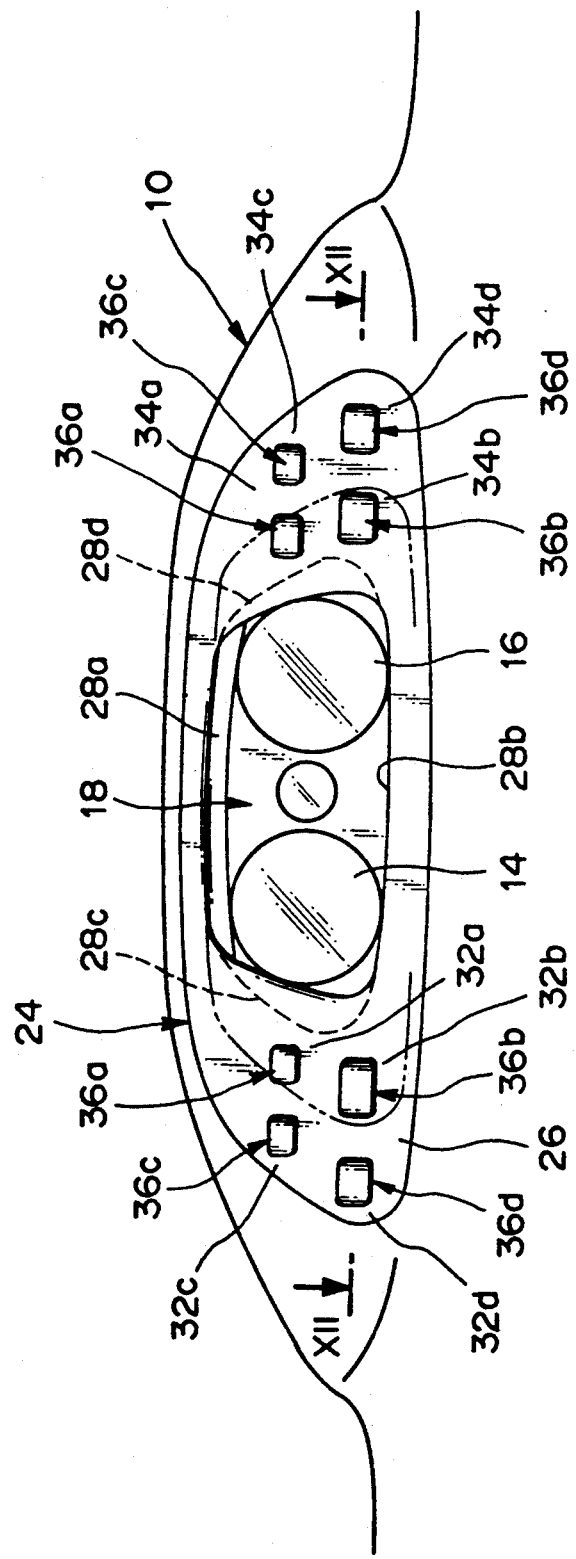
FIG. 11 is a front view showing the structure of the meter hood in the embodiment shown in FIG. 10.

In this embodiment, as can be seen from FIG. 11, first areas 32a and 34a are defined on the curved surface portion 26 by areas which can be accessed by simply stretching forward the left or right hand released from the steering wheel 20. The same first-class operation switches 36a as in the above embodiment are mounted on the first areas 32a and 34a. Second areas 32b and 34b are defined by areas which are located immediately below the first areas 32a and 34a, and can be accessed by simply moving downward the hand operating the first-class operation switches 36a. The same second-class operation switches 36b as in the above embodiment are mounted on the second areas 32b and 34b. Third areas 32c and 34c are defined by areas which are located on the left and right outer sides of the first areas 32a and 34a, and can be accessed by simply moving the hand operating the first-class operation switches 36a to the left or right. The same third-class operation switches 36c as in the above embodiment are mounted on the third areas 32c and 34c. Fourth areas 32d and 34d are defined by areas which are located immediately below the third areas 32c and 34c, and can be accessed by simply moving downward the hand operating the third-class operation switches 36c. The same fourth-class operation switches 36d as in the above embodiment are mounted on the fourth areas 32d and 34d.

Figure 12:
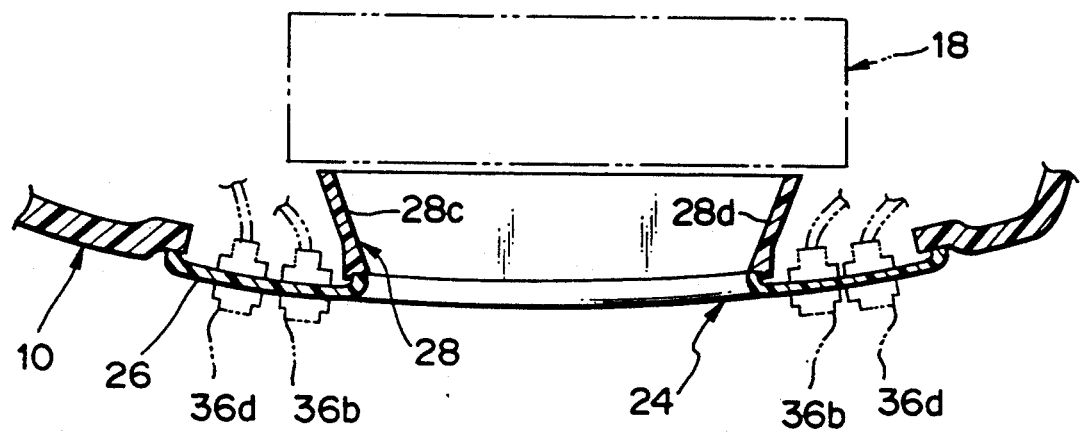
FIG. 12 is a cross-sectional view showing a curved state of a curved surface portion of the meter hood.
Figure 13:
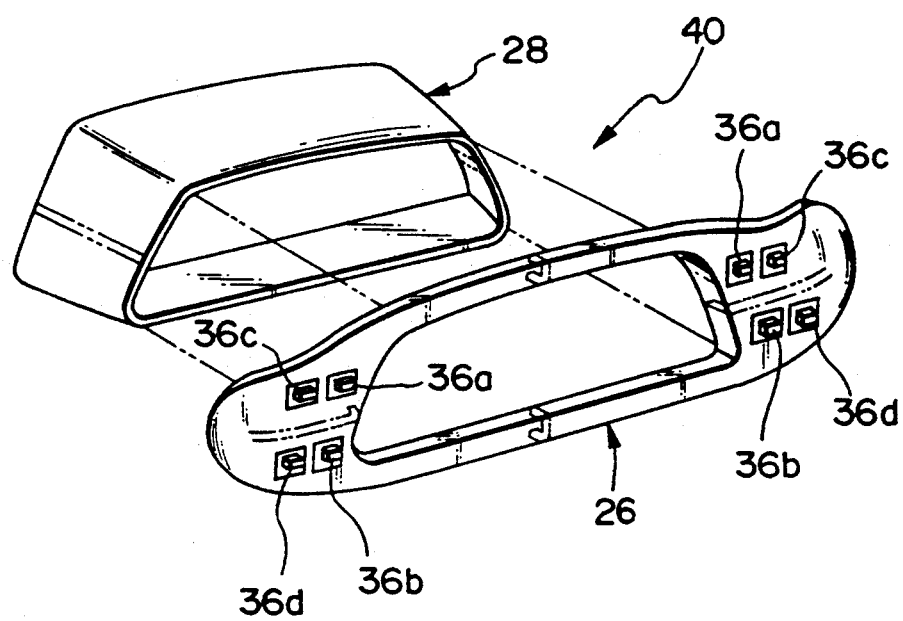
FIG. 13 is an exploded perspective view showing an assembling state of a meter assembly.
Figure 14:
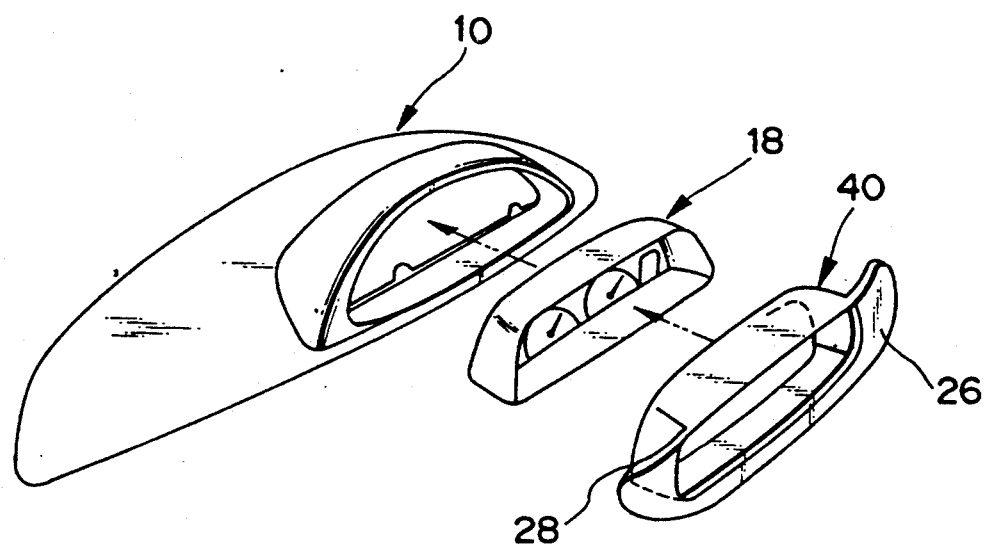
FIG. 14 is an exploded perspective view showing a state wherein the meter assembly is assembled in the dashboard.

As shown in detail in FIG. 12, more preferably, the curved surface portion 26 and the longitudinal wall portions 28 of the meter hood 24 are independently formed to allow easy mold releasing in a molding process without using special molds. When the meter hood 24 and the meter assembly 18 are assembled to the dashboard 10, the operation switches 36a through 36d are mounted on the curved surface portion 26 according to their importances. Thereafter, as shown in FIG. 13, the curved surface portion 26 is jointed to the rear end sides of the longitudinal wall portions 28, thus forming a meter hood assembly 40. As shown in FIG. 14, after the meter assembly 18 is assembled in a predetermined recess portion in the dashboard 10, the meter hood assembly 40 is assembled on the passenger room side of the meter assembly 18.

The left and right longitudinal wall portions 28c and 28d of the meter hood 24 are inclined to be tapered wider toward the front side of the vehicle body along the outermost view lines La and Lb of the field of view of the passenger M who is seated on the driver's seat 12 and looks at the meter assembly 18. Therefore, the field of view of the passenger M will not be narrowed, and the visibility of the meters 14 and 16 from the passenger M can be prevented from being impaired.

As described above, according to this embodiment, the proximal end portions, on the front side of the vehicle body, of the left and right longitudinal wall portions 28c and 28d of the longitudinal wall portions 28 of the meter hood 24 extend toward the meter side along the outermost view lines La and Lb of the field of view of the passenger M who looks at the meter assembly 18. Therefore, the field of view of the passenger M who looks at the meters 16 can be guaranteed. Furthermore, new dashboard attachments such as switches, indication lamps, and the like can be attached to the extended portion. More specifically, in this embodiment, the effective mounting space of the dashboard 10 can be extended without impairing the visibility of the meters, and the degree of freedom of a layout of various attachments on the dashboard 10 can be improved.

The operation switches 36a through 36d are mounted on the curved surface portion 26, and are located at positions corresponding to their importances. Therefore, the same effect as in the above embodiment can be obtained. In addition, if mounting members are indication means such as indication lamps, the visibility of the lamps can be improved.

In this embodiment, both the left and right longitudinal wall portions 28c and 28d of the meter hood 24 are tapered along the outermost view lines of the field of view of the passenger M who looks at the meter assembly 18. However, the present invention is not limited to this structure. For example, one of the left and right longitudinal wall portions may be tapered.

More specifically, as shown in FIG. 15 as another modification, only the right longitudinal wall portion 28d of the meter hood 24 is tapered along the outermost view line Lb of the field of view of the passenger M who looks at the meter assembly 18, and the remaining longitudinal wall portions such as the left longitudinal wall portion 28c are tapered wider toward the passenger M like in a conventional structure.

The first area 34a is defined on the curved surface portion 26 formed by extending the proximal end portion of the right longitudinal wall portion 28d toward the meter assembly 18. On the first area 34a, most important switches which are most closely related to the safety of the vehicle, and operate equipments which are relatively frequently used, e.g., the first-class operation switches 36a such as front and rear window defroster switches, a rear wiper switch, a hazard way light switch, and the like, are arranged. The second area 34b is defined on the outer right side of the first area 34a, and the second-class operation switches 36b are arranged on the second area 34b.

Note that the second area 32b is defined on the curved surface portion 26 to which the proximal end portion of the left longitudinal wall portion 28c is connected, and the second-class operation switches 36b are mounted on the second area 32b.

As described above, according to the present invention, the portions, near the mounting position of the steering wheel, of the operation switch mounting portions arranged on the dashboard are located on the rear side of the vehicle body, i.e., at positions near a driver, and important operation switches are arranged on these portions. Therefore, the important switches can be quickly operated. The instrument panel is curved so that the operation switches are located on the front side of the vehicle body as they are separated from the mounting position of the steering wheel. Therefore, the driver can be prevented from feeling oppression by the dashboard.

The switch arranging surfaces facing the driver are formed on the operation switch mounting portions, and the operation switches arranged on the switch arranging surfaces can be directed toward the driver. Therefore, the visibility and operability of the operation switches can be improved.

As many apparently widely different embodiments of the present invention can be made without departing from the spirit and scope thereof, it is to be understood that the invention is not limited to the specific embodiments thereof except as defined in the appended claims.

What is claimed is:

1. An instrument panel structure of a vehicle having a front window, which comprises:
    a dashboard member arranged on a front side of a passenger room;
    a steering wheel having a steering column, arranged in front of a driver's sear, for regulating a travel direction of a vehicle;
    an instrument panel which is defined on said dashboard member and arranged on said dashboard member at a position opposing said driver's seat, on which various operation switches are mounted, and having various meters; and
    a meter hood mounted on said instrument panel to cover said instrument panel, wherein said meter hood includes upper, lower, right, and left longitudinal wall portions extending from said instrument panel toward the front side of the vehicle body, at least one of said right and left longitudinal wall portions of said longitudinal wall portions is tapered to extend along an outermost view line of a field of view of a driver who looks at said instrument panel, and an extending portion extending along a widthwise direction of the vehicle body is connected to a rear portion of the tapered longitudinal wall portion; and
    wherein said dashboard member gradually curves convexly with respect to a driver seated on the driver's seat,
    said dashboard member has a first area which is defined on a first portion near the steering column of said steering wheel, and on which a first-class operation switch having the highest importance of said various operation switches is mounted,
    said dashboard member has a second area which is defined on a second portion farther from the steering column of said steering wheel than said first area, and on which a second-class operation switch having an importance lower than said first-class operation switch of said various operation switches is mounted, and
    said dashboard member has a low point in relationship to the front window facing the front of the driver's seat into which the steering column is extended.

2. The structure according to claim 1, wherein both said right and left longitudinal wall portions are tapered to extend along the outermost view lines of the field of view of the driver who looks at said instrument panel, and
    extending portions respectively extending to the right and left along the widthwise direction of the vehicle body and connected to rear end portions of said tapered right and left longitudinal wall portions.

3. The structure according to claim 2, wherein said dashboard member is constituted by a portion of said extending portions.

4. The structure according to claim 1, wherein only said right longitudinal wall portion is tapered to extend along the outermost view line of the field of view of the driver who looks at said instrument panel, and wherein said extending portion extends to the right along the widthwise direction of the vehicle body and is connected to a rear end portion of said tapered right longitudinal wall portion.

5. The structure according to claim 4, wherein said dashboard member is constituted by a portion of said extending portion.

6. An instrument panel structure of a vehicle, which comprises:
(a) a dashboard member arranged on a front side of a passenger room;
(b) a steering wheel, arranged in front of a driver's seat, for regulating a travel direction of the vehicle;
(c) an operation switch mounting portion which is defined on said dashboard member, and on which various operation switches are mounted, wherein said operation switch mounting portion is curved forwardly relative to the vehicle body as distance from a mounting position of said steering wheel increases and wherein said operation switch mounting portion has a first area which is defined on a first portion near the mounting position of said steering wheel, and on which a first-class operation switch having the highest importance of said various operation switches is mounted;
(d) an instrument panel arranged on said dashboard member at a position opposing said driver's seat, and having various meters; and
(e) a meter hood mounted on said dashboard member to cover said instrument panel, the meter hood including upper, lower, right, and left longitudinal wall portions extending from said dashboard member toward the front side of the vehicle body, at least one of said right and left longitudinal wall portions of said longitudinal wall portions being tapered to extend along an outermost view line of a field of view of a driver who looks at said instrument panel, and an extending portion extending along a widthwise direction of the vehicle body and connected to a rear end portion of the tapered longitudinal wall portion.

7. The structure according to claim 6, wherein both said right and left longitudinal wall portions are tapered to extend along the outermost view lines of the field of view of the driver who looks at said meter assembly, and extending portions respectively extend to the right and left along the widthwise direction of the vehicle body and are connected to rear end portions of said tapered right and left longitudinal wall portions.

8. The structure according to claim 7, wherein said operation switch portion is constituted by a portion of said extending portions.

9. The structure according to claim 6, wherein only said right longitudinal wall portion is tapered to extend along the outermost view line of the field of view of the driver who looks at said meter assembly, and wherein said extending portion extends to the right along the widthwise direction of the vehicle body and is connected to a rear end portion of said tapered right longitudinal wall portion.

10. The structure according to claim 9, wherein said operation switch portion is constituted by a portion of said extending portion.

* * * * *